United States Patent
Ignaczak et al.

(10) Patent No.: US 10,471,934 B2
(45) Date of Patent: Nov. 12, 2019

(54) BOUNDARY DETECTION SYSTEM UTILIZING WIRELESS SIGNALS

(71) Applicant: Ford Global Technologies, LLC, Dearborn, MI (US)

(72) Inventors: Brad Alan Ignaczak, Canton, MI (US); Adil Nizam Siddiqui, Farmington Hills, MI (US); Brian Bennie, Sterling Heights, MI (US); Jacob Lucero, Dearborn Heights, MI (US); Cynthia M. Neubecker, Westland, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/762,758

(22) PCT Filed: Oct. 21, 2015

(86) PCT No.: PCT/US2015/056581
§ 371 (c)(1),
(2) Date: Mar. 23, 2018

(87) PCT Pub. No.: WO2017/069747
PCT Pub. Date: Apr. 27, 2017

(65) Prior Publication Data
US 2019/0084525 A1    Mar. 21, 2019

(51) Int. Cl.
*B60R 25/31*        (2013.01)
*H04W 4/40*        (2018.01)
(Continued)

(52) U.S. Cl.
CPC ........... *B60R 25/31* (2013.01); *B60Q 9/00* (2013.01); *B60R 25/1001* (2013.01); *B60R 25/1012* (2013.01); *B60W 50/14* (2013.01); *G01S 7/021* (2013.01); *G01S 7/022* (2013.01); *G08G 1/0962* (2013.01); *G08G 1/166* (2013.01); *H04W 4/023* (2013.01); *H04W 4/046* (2013.01); *H04W 4/40* (2018.02); *B60R 25/104* (2013.01); *B60R 2325/101* (2013.01); *G06K 9/00362* (2013.01);
(Continued)

(58) Field of Classification Search
CPC combination set(s) only.
See application file for complete search history.

(56) References Cited

U.S. PATENT DOCUMENTS 6,101,428 A * 8/2000 Snyder ................ B60R 25/245
                                                                340/425.5
8,049,659 B1    11/2011 Sullivan et al.
(Continued)

OTHER PUBLICATIONS

International Search Report PCT 2015 056 581, dated Jan. 5, 2016, 1 page.

*Primary Examiner* — Nabil H Syed
*Assistant Examiner* — Cal J Eustaquio
(74) *Attorney, Agent, or Firm* — Brandon Hicks; Brooks Kushman P.C.

(57) ABSTRACT

A boundary detection system for a vehicle includes a controller programmed to generate an alert in response to sensing a presence of a person in a first zone extending from the vehicle. The system also includes a wireless receiver configured to receive signals transmitted by a nomadic device in a second zone surrounding the vehicle. The controller is further programmed to, in response to the receiver receiving the signals, output the alert.

20 Claims, 3 Drawing Sheets

(51) Int. Cl.

| | |
|---|---|
| *B60Q 9/00* | (2006.01) |
| *B60W 50/14* | (2012.01) |
| *G08G 1/0962* | (2006.01) |
| *G08G 1/16* | (2006.01) |
| *G01S 7/02* | (2006.01) |
| *H04W 4/02* | (2018.01) |
| *B60R 25/10* | (2013.01) |
| *G06K 9/00* | (2006.01) |
| *H04N 5/225* | (2006.01) |
| *G08B 13/187* | (2006.01) |
| *G08B 13/196* | (2006.01) |
| *H04W 4/80* | (2018.01) |
| *B60R 25/104* | (2013.01) |
| *H04W 84/12* | (2009.01) |
| *H04W 4/04* | (2009.01) |

(52) U.S. Cl.
CPC ........ *G06K 9/00791* (2013.01); *G08B 13/187* (2013.01); *G08B 13/19647* (2013.01); *H04N 5/225* (2013.01); *H04W 4/80* (2018.02); *H04W 84/12* (2013.01)

(56) References Cited

U.S. PATENT DOCUMENTS

| | | |
|---|---|---|
| 2011/0140916 A1 | 6/2011 | Kao |
| 2011/0148610 A1 | 6/2011 | Snider et al. |
| 2011/0218709 A1* | 9/2011 | Hermann ............... B60R 25/20 701/45 |
| 2011/0285519 A1 | 11/2011 | Scheuermann et al. |
| 2013/0181860 A1 | 7/2013 | Le et al. |
| 2013/0342333 A1 | 12/2013 | Hutchings |
| 2014/0138474 A1 | 5/2014 | Sharpin et al. |
| 2014/0309919 A1 | 10/2014 | Ricci |
| 2018/0077124 A1* | 3/2018 | Ramoutar ............ H04L 63/067 |

* cited by examiner

BOUNDARY DETECTION SYSTEM UTILIZING WIRELESS SIGNALS

CROSS-REFERENCE TO RELATED APPLICATION

This application is the U.S. national phase of PCT Application No. PCT/US2015/056581 filed on Oct. 21, 2015, the disclosures of which is incorporated in its entirety by reference herein.

TECHNICAL FIELD

This application generally relates to boundary alert systems for vehicles.

BACKGROUND

Vehicles are used in a variety of applications for a variety of purposes. Vehicles may be used for law enforcement activities. Police officers may spend a large amount of time in the vehicle. Officers may spend time in the vehicle using a computer system to process information or generate reports. In other situations, an officer's attention may be directed to observing a particular location or person. As such, the police officer may be distracted and less alert to persons that may be lurking near the vehicle. For example, an officer's attention may be directed to activities occurring in front of the vehicle and may not be alert to potential activities taking place toward the rear of the vehicle. Officers focused on their duties and tasks in the vehicle may be susceptible to harm by persons approaching the vehicle from a direction in which the officer is not monitoring.

SUMMARY

In some configurations, a boundary detection system for a vehicle includes a controller programmed to generate an alert in response to sensing a presence of a person in a first area around the vehicle. The boundary detection system also includes a wireless receiver configured to receive signals transmitted by a nomadic device in a second area around the vehicle, in which the controller is further programmed to, in response to the receiver receiving the signals, output the alert. Other configurations may include corresponding computer systems, apparatus, and computer programs recorded on one or more computer storage devices, each configured to perform the actions of the methods.

Some configurations may include one or more of the following features. The boundary detection system in which the second area includes the first area. The boundary detection system in which the wireless receiver is configured to receive signals transmitted according to at least one of a plurality of IEEE 802.11 wireless communication standards. The boundary detection system in which the wireless receiver is configured to receive signals transmitted to a cellular phone network according to at least one of a plurality of cellular communication standards. The boundary detection system of a claim 1 in which the wireless receiver is configured to receive signals transmitted according to at least one of a plurality of Bluetooth communication standards. The boundary detection system in which the wireless receiver is configured to receive signals transmitted from a dedicated short-range communication system. The boundary detection system may include a display and the controller may be further programmed to output, to the display, an indication of a type of signal that caused the alert. The boundary detection system in which the wireless receiver is further configured to output a signal strength of the signals that are received. The boundary detection system in which the controller is further programmed to estimate a distance of the nomadic device from the vehicle based on the signal strength. The boundary detection system in which the controller is further programmed to estimate a direction of travel of the nomadic device based on a change in the signal strength. The boundary detection system in which the controller is further programmed to, in response to the alert, command activation of door locks. The boundary detection system in which the controller is further programmed to, in response to the alert, command windows that are open to close. The boundary detection system may include a radar receiver configured to monitor for radar signals transmitted by other vehicles, and in which the controller may be further programmed to output the alert in response to receiving radar signals transmitted by other vehicles. Implementation of the described configurations may include hardware, a method or process, or computer software on a computer-accessible medium.

In some configurations, a vehicle includes a boundary alert sensor configured to detect a presence of a person located in a first zone extending from the vehicle. The vehicle also includes a wireless receiver configured to receive signals transmitted to a receiver external to the vehicle by a nomadic device that is outside of the vehicle in a second zone surrounding the vehicle and including at least part of the first zone. The vehicle also includes a controller programmed to, in response to the presence of the person being detected in the first zone, output an alert, and, in response to the receiver receiving the signals, output the alert. Other configurations may include corresponding computer systems, apparatus, and computer programs recorded on one or more computer storage devices, each configured to perform the actions of the methods.

Some configurations may include one or more of the following features. The vehicle in which the wireless receiver is configured to receive signals transmitted according to at least one of a plurality of IEEE 802.11 wireless communication standards. The vehicle in which the wireless receiver is configured to receive signals transmitted to a cellular phone network according to at least one of a plurality of cellular communication standards. The vehicle in which the wireless receiver is configured to receive signals transmitted according to at least one of a plurality of Bluetooth communication standards. The vehicle in which the wireless receiver is configured to receive signals transmitted from a dedicated short-range communication system. Implementation of the described configurations may include hardware, a method or process, or computer software on a computer-accessible medium.

In some configurations, a method of detecting a person in a vicinity of a vehicle includes monitoring, by a controller, a boundary alert sensor configured to detect a presence of a person located in a first zone extending from the vehicle. The method also includes outputting, by the controller, an alert in response to detecting the presence of the person in the first zone. The method also includes monitoring, by the controller, for wireless signals transmitted to a receiver external to the vehicle by a nomadic device that is in a second zone surrounding the vehicle. The method also includes outputting, by the controller, the alert in response to receiving the wireless signals. Other configurations may include corresponding computer systems, apparatus, and computer programs recorded on one or more computer storage devices, each configured to perform the actions of the methods.

Some configurations may include one or more of the following features. The method may include outputting, by the controller, a type of wireless signal that caused the alert. Implementation of the described configurations may include hardware, a method or process, or computer software on a computer-accessible medium.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

To enhance safety of persons in a vehicle, a boundary detection system may be deployed to provide an alert to occupants of the vehicle that persons may be near the vehicle. Such a system may be capable of detecting persons in the vicinity of vehicle and provide a warning of their presence in the area. The boundary detection system may utilize a radar system as may be found in a blind spot warning system. The boundary detection system may utilize an ultrasonic sensor as may be found in a backup warning system. The sensors utilized by the boundary detection system may be active sensors that send out a signal and receive a return signal. Additional sensors may include camera systems incorporating image processing schemes to detect persons near the vehicle.

Figure 1:
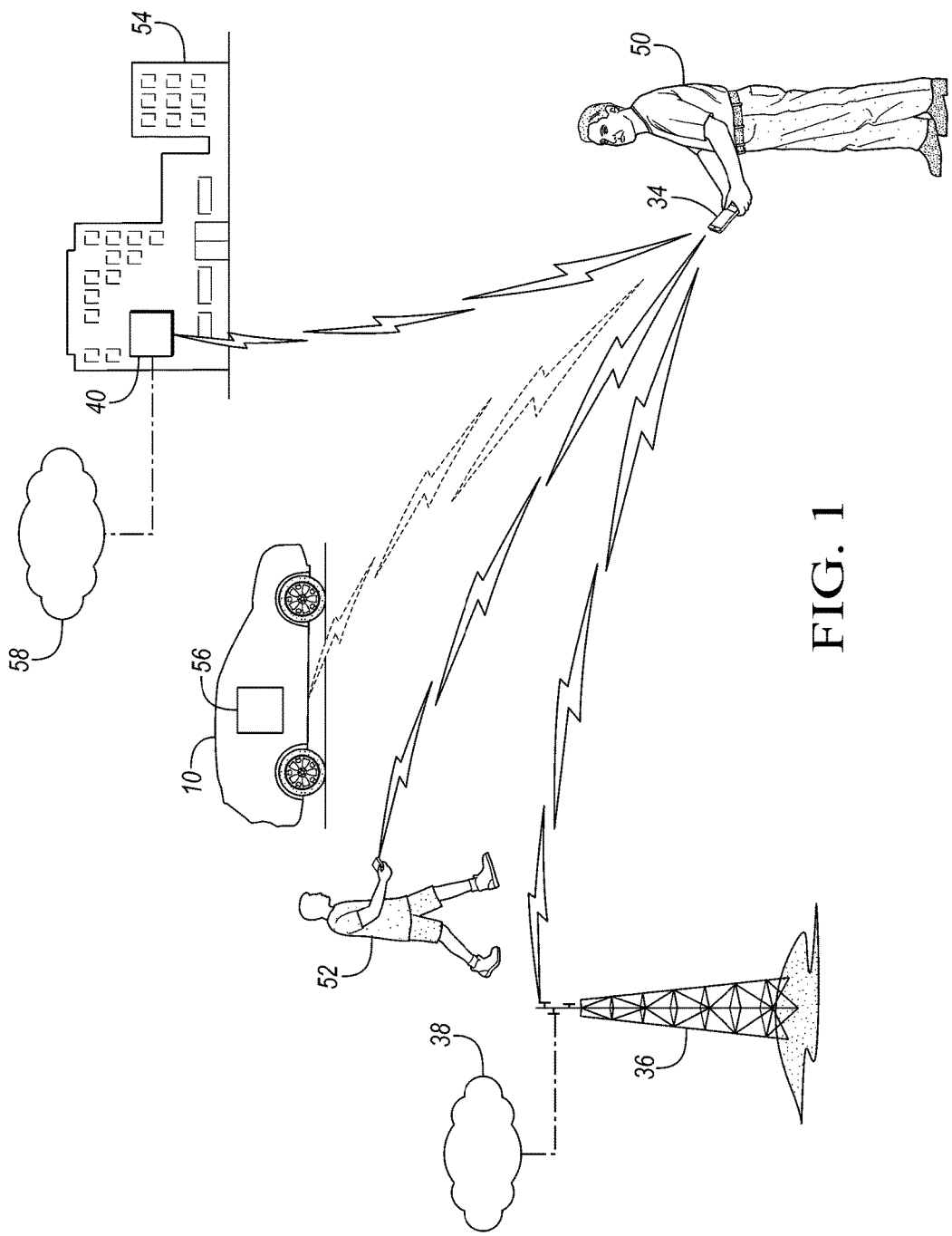
FIG. 1 depicts an environment in which a vehicle that includes a boundary detection system may operate.

FIG. 1 depicts an overview of an environment in which a vehicle 10 may be located. For example, the vehicle 10 may be used by law enforcement personnel. During the course of a shift, officers may be parked in the vehicle to perform various tasks. For example, officers may be using a computer to process information or may be observing activities in a specific area. At such times, officers may be distracted by the tasks that they are performing and may be unaware of potential threats that may be nearby. For example, one or more persons 50, 52 may be walking in the vicinity of the vehicle 10. To enhance safety of the officers in the vehicle 10, it may be useful if persons 50, 52 near the vehicle could be detected.

The vehicle 10 may include a boundary detection system 56. The boundary detection system 56 may be configured to monitor various vehicle sensors to detect the presence of persons 50, 52 or other objects (e.g., vehicles) that are near the vehicle 10 or moving near the vehicle 10. The boundary alert system 56 may provide an alert to officers in the vehicle 10 when a presence of a person 50, 52 is detected near the vehicle 10. This allows officers to focus on various tasks without having to constantly monitor around the vehicle 10 in all directions.

The boundary detection system 56 may include various sensors that are configured to detect objects and persons 50, 52 near the vehicle 10. It may be possible to further enhance the boundary detection system 56 by monitoring for wireless transmissions emitted from a nomadic device 34 that may be carried by the person 50 in the vicinity of the vehicle 10. The boundary detection system 56 may be further enhanced to detect communications from other vehicles, including airborne drones. Today, most people carry at least one nomadic device 34 such as a mobile phone. The nomadic device 34 may include a mobile phone, a tablet, a computer, and other such electronic devices. Any portable electronic device capable of communicating wirelessly to a network or other device may be included. In addition, the nomadic device 34 may include an airborne drone or a remote control vehicle/aircraft. A feature of nomadic devices is that they are generally configured to establish communication via a wireless communications channel to exchange information with a network or other nomadic devices.

The nomadic device 34 may be configured to communicate with a first network 38 through communication with a cellular tower 36. The first network 38 may include voice and data communications. The nomadic device 34 may be configured to communicate with a second network 58 through communication with a wireless network router 40. For example, the wireless network router 40 may be in a nearby building 54 and may be configured to connect WiFi devices to the second network 58.

The vehicle 10 may include various systems and sensors that may be included as part of the boundary detection system 56. The boundary detection system 56 may include any sensing sub-systems that sense objects within a range or boundary surrounding the vehicle 10. For example, the boundary detection system 56 may include one or more cameras that are part of various vehicle sub-systems. The cameras may be configured to provide a video signal when activated. The video signal may be displayed and further processed (e.g., for object detection). For example, a reverse parking aid (RPA) or backup monitoring system may include a back-up camera which provides video of an area behind the vehicle 10. The vehicle 10 may also include a forward-looking camera that may be part of an Adaptive Cruise Control (ACC) and Collision Warning (CW) system or a Lane-Departure Warning (LDW) system. Additional side-facing cameras may be part of a Blind Spot Warning System (BLIS).

Figure 2:
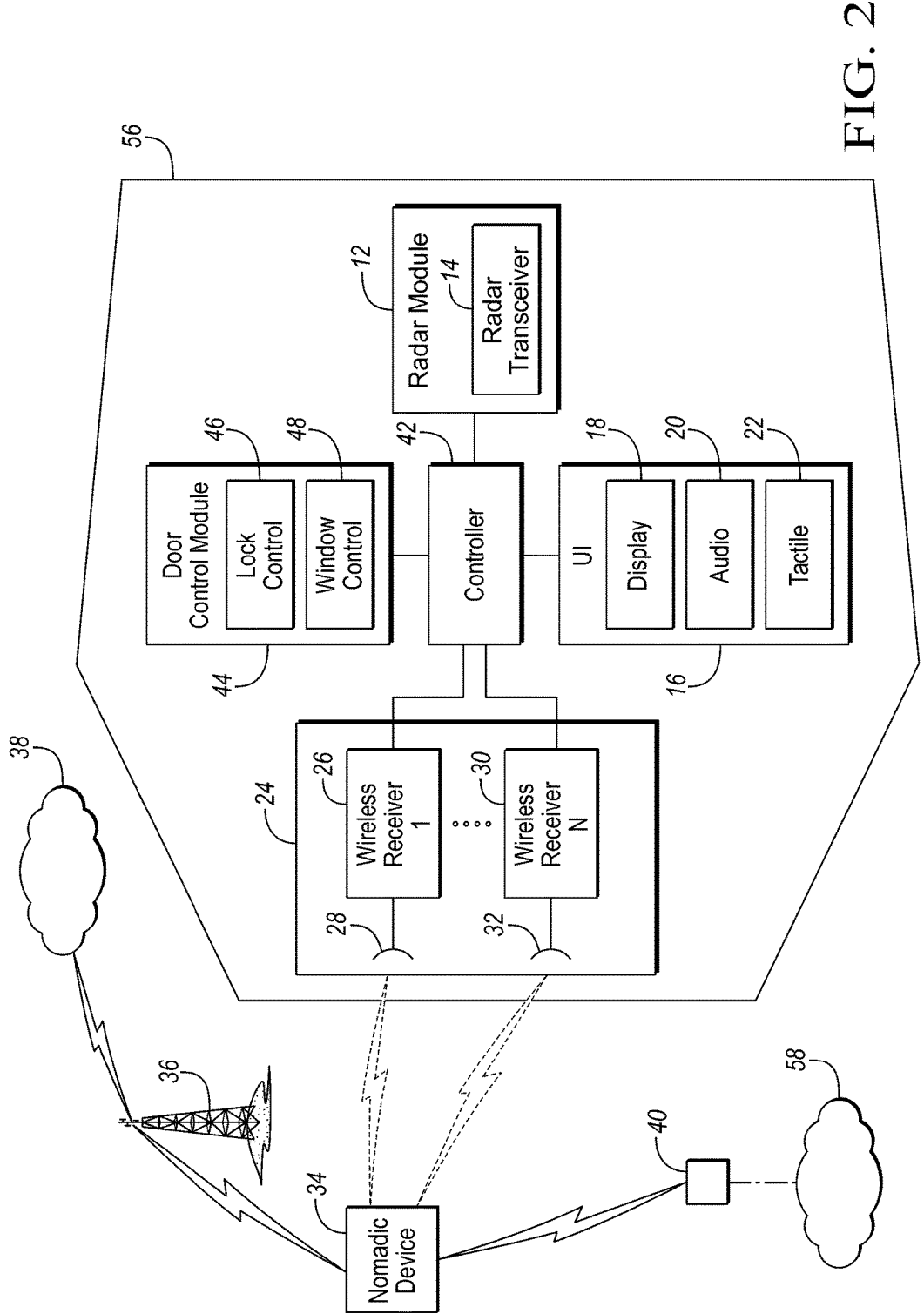
FIG. 2 is a block diagram of a possible configuration for the boundary detection system.

FIG. 2 depicts a diagram of a possible configuration of a boundary detection system 56. The boundary detection system 56 may include one or more radar modules 12 to detect objects in various positions around the vehicle 10. The radar system 12 may include a radar transceiver 14 that is configured to transmit and receive radar signals. The radar system 12 may detect objects around the vehicle 10 and a relative motion of the objects. The radar system 12 may operate by transmitting an electromagnetic wave and receiving a reflected electromagnetic wave from objects in the path of the transmitted electromagnetic wave. The output of the radar system 12 may include a presence of the object, a position of the object relative to the vehicle 10, and a relative velocity of the object. The radar module may be part of an ACC/CW system that provides information associated with objects located in an area to the front of the vehicle 10. The BUS may include side-facing radars. The backup-monitoring system may include a rear-facing radar. The radar system 12 may be configured to detect objects in front of the vehicle, behind the vehicle, and along the sides of the vehicle. The radar system 12 may be laser-based radar systems (e.g., lidar). A characteristic of the radar system 12 is that it may only cover a limited zone in front of the radar unit. As such, multiple radar systems may be needed to detect objects around the vehicle 10.

Electronic modules in the vehicle 10 may communicate via a vehicle network (not shown). The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the vehicle battery. Different signals may be transferred over different channels of the vehicle network 60. For example, video signals may be transferred over a high-speed channel (e.g., Ethernet) while control signals may be transferred over CAN or discrete signals. The vehicle network may include any hardware and software components that aid in transferring signals and data between modules.

The boundary detection system 56 may include an ultrasonic sensor. The ultrasonic sensor may be part of the backup monitoring system or a front parking aid system. The ultrasonic sensing system may detect objects within a predetermined range of the vehicle 10. The ultrasonic sensing system may emit high-frequency sound waves and detect a signal reflected from an object.

The boundary detection system 56 may output various warnings and indicators to notify a user of an object in the detection zone. The vehicle 10 may include a user interface 16 that includes a display 18 configured to provide output to the operator. In some configurations, the display 18 may be a touchscreen display configured to allow user input by touching locations on a screen of the display 18. The user interface 16 may further include input devices configured to allow the operator to configure the boundary detection system 56. A controller 42 may be programmed to output signals to the user interface 16 and accept inputs from the user interface 16. The user interface 16 may be used to display options for boundary detection system functions that are to be activated. The various sensors associated with the boundary detection system 56 may be separately activated and deactivated via the user interface 16. The user interface 16 may include lamps, lights, or other status indicators mounted within the vehicle 10.

The user interface 16 may further include one or more audible indicators 20 that provide an audible alert in response to an actuation signal. The audible indicators 20 may include speakers, buzzers, alarms, and horns. For example, a speaker that is part of an entertainment system may be used. The user interface 16 may include one or more tactile indicators 22 that cause a vibration (e.g., steering wheel vibration) in response to an actuation signal.

The display 18 may be configured to display pictures and video from the cameras. The display screen 18 may be located in a dashboard of the vehicle 10. In some configurations, the display screen 18 may be configured to display video from an active camera under certain conditions. For example, when a transmission of the vehicle 10 is in a reverse gear, video images from the backup camera may be displayed. In some configurations, the video from the may be displayed when the vehicle 10 is in a parked condition (e.g., transmission gear is PARK). In some configurations, the video signal may be displayed during a parking maneuver. In some configurations, the video signal that is displayed may be selected by an operator. In some configurations, display of video on the display 18 may be inhibited when the vehicle 10 is moving.

The display 18 may be further configured to display status of the boundary detection system 56. For example, an image of the vehicle 10 may be displayed. Objects or persons detected near the vehicle 10 may be displayed on a screen position relative to the vehicle 10 in accordance with the detected location of the object or person. The displayed content may resemble a radar map with the vehicle 10 at the center. A series of concentric circles may be displayed about the vehicle with each circle indicating a distance of an object or person from the vehicle 10. When an object or person is closer to the vehicle 10 than the distance associated with the circle, the circle may be highlighted on the display 18.

The controller 42 may be programmed to monitor the status of the various boundary alert sensors. When one or more of the boundary alert sensors detect an object within range, the controller 42 may generate an alert signal. The alert signal may then trigger activation of device to warn the vehicle occupants of a person near the vehicle 10.

The boundary detection system 56 may include an interface to a door control module 44 of the vehicle 10. The door control module 44 may be configured to open, close, or lock various entry/exit points of the vehicle. The door control module 44 may include a lock control subsystem 46 that is configured to operate door locks of the vehicle 10. In response to the alert, the controller 42 may output a command to the door control module 44 to close any open entry points to the vehicle including a sunroof, a tailgate, a trunk, a hatch, or a window. For example, the door control module 44 may include a window control subsystem 48 that is configured to operate windows of the vehicle 10. The door control module 44 may be connected to the vehicle network. In response to an alert, the controller 42 may output a command to the lock control subsystem 46 to actuate the door locks in a locked position. In response to the alert, the controller 42 may output a command to the window control module to actuate the windows to a closed position. Such actions may improve safety of the occupants of the vehicle 10 by making the interior of the vehicle 10 less accessible to intruders.

Present boundary detection systems generally utilize active sensing devices to monitor the area around the vehicle 10. For example, radar and ultrasonic systems output an electromagnetic wave that is reflected back from objects in the path of the wave. The reflected signal is processed and the presence of an object or person 50 may be detected. Such sensors also provide an opportunity for persons to detect the electromagnetic signals being sent by the boundary detection system 56 and allow persons to evade detection. The stealthiness of the boundary detection system 56 may be improved by passively monitoring the surrounding environment to detect signals that may be emitted by devices carried by persons 50, 52 in the nearby environment.

Sensors currently used by boundary detection systems generally have a limited range for detecting objects near the vehicle 10. Radar systems 12 and cameras may be limited by stationary objects in the path of the radar or camera. Some of the sensing devices used by the boundary detection system 56 may have a limited range or field of view. Further, radar systems 12 are directional sensors that may detect objects in a limited arc in the path of the radar signals. Cameras may have limited visibility during night time or certain weather conditions. Other sensors, such as ultrasonic sensors, may have limited range for sensing objects. Generally, a person near the vehicle 10 must be in the path and sensing range of one of the sensors in order to be physically detected. In many situations, nearby obstructions may make it difficult to detect nearby persons. A person located behind the obstacle may not be detectable by conventional boundary alert sensors. These factors may limit the effectiveness of the boundary detection system 56. The boundary detection system 56 may be improved by incorporating additional sensing capabilities having greater range capabilities.

The boundary detection system 56 may include one or more controllers 42 that are configured to monitor the various boundary alert sensors and generate an alert. The controller 42 may monitor signals from the radar system 12, camera system, and other sensors described and output an alert when an object or person is detected. The boundary detection system 56 may be configured to detect the nomadic device 34 that may be carried by the person 50 near the vehicle 10.

The vehicle 10 may already be configured with wireless communication interfaces that are compatible with those interfaces found on the nomadic device 34. For example, many vehicles include a Bluetooth interface for pairing with nomadic devices 34 to provide hands-free phone capability. Therefore, wireless communication circuitry and processing capability may already be available in most vehicles for monitoring the wireless communications channels. By passively monitoring for wireless communications transmitted between nomadic devices 34 and external receivers, it may be possible to extend the range of the boundary detection system 56.

Nomadic devices 34 may be able to communicate using a variety of wireless communication standards or protocols. The nomadic device (e.g., mobile phone) 34 may establish communications over a cellular phone network. Further, the nomadic device 34 may be configured to communicate via one or more of the wireless networking IEEE 802.11 standards (e.g., WiFi). In addition, the nomadic device 34 may include a Bluetooth or Bluetooth Low Energy (BLE) interface. Any of these wireless signals emanating from the nomadic device 34 may be monitored to detect the presence of the nomadic device 34 that is in the vicinity of the vehicle 10. The boundary detection system 56 may be configured to passively monitor for the wireless communication signals so as not to alert the person 50 that the boundary detection system 56 is in the vicinity. An additional benefit of monitoring for these signals is that the wireless communication signals may be detected at a greater range than some of the boundary alert sensor signals. In addition, the wireless communication signals may be less susceptible to obstructions between the boundary detection system 56 and the nomadic device 34.

The boundary detection system 56 may include a wireless communications system 24 to communicate with remote devices. The wireless communications system 24 may include a number (e.g., N) of wireless receivers 26, 30 that are configured to receive signals via one or more wireless communication protocols. Note that the wireless receivers 26, 30 may be part of a transceiver module that is configured to both receive and transmit according to a specified communication protocol. Note that a first wireless receiver 26 (e.g., receiver one) and a second wireless receiver 30 (e.g., receiver N) are depicted. The wireless receivers 26, 30 are labeled differently as the receiver configuration depends upon the wireless communication protocol that is supported by the particular receiver. Any number of wireless receivers 26, 30 may be present to support a plurality of wireless communication protocols. The wireless receivers 26, 30 may be coupled to associated antennas 28, 32. The antennas 28, 32 may be configured to convert electromagnetic waves into electrical signals. In some configurations, a single antenna may be utilized. Multiple antennas 28, 32 may be desired to optimize signal reception within a desired range of frequencies for each of the wireless communication channels to be monitored. The antennas 28, 32 may be configured to be of a length optimized to receive a certain range of frequencies associated with the wireless communication protocol.

One or more of the wireless receivers 26, 30 may be configured to monitor wireless transmissions sent via a cellular phone network. The wireless receivers 26, 30 may be configured to receive signals transmitted to a cellular phone network according to one or more of a plurality of cellular communication standards. For example, a nomadic device 34 having cellular phone capability may be capable of communicating using a variety of wireless protocols. The nomadic device 34 may establish communications over a cellular phone network 38 via the cellular tower 36. Wireless communication standards for cellular communications may include Global System for Mobile Communications (GSM) systems, Code Division Multiple Access (CDMA) systems, Time Division Multiple Access (TDMA) systems, Universal Mobile Telecommunications System, 3G and 4G systems. The wireless receivers 26, 30 may support any and all of the possible standards for cellular communications.

One or more of the wireless receivers 26, 30 may be configured to monitor WiFi communications according to one or more of the IEEE 802.11 standards. In the United States, WiFi using the 802.11b and 802.11g standards operate in the 2.4 GHz frequency band, while WiFi using the 802.11a and 802.11n standards operate in the 5 GHz frequency band. Each of the frequency bands may be divided into a number of channels. For example, in the 2.4 GHz frequency range there may be 14 channels spaced apart in 5 MHz increments. Note that the allocation of the frequency spectrum may vary by country.

One or more of the wireless receivers 26, 30 may be configured to monitor Bluetooth and/or Bluetooth low energy (BTLE) wireless communications according to one or more applicable Bluetooth standards. For example, the wireless receiver may communicate according to the IEEE 802 PAN (personal area network) protocols of which Bluetooth is a subset. Bluetooth communication standards and protocols may be defined by the Bluetooth Special Interest Group (SIG). One or more of the wireless receivers may be Bluetooth receivers.

One or more of the wireless receivers 26, 30 may be configured to monitor communication signals in a frequency range allocated to Dedicated Short-Range Communications (DSRC). DSRC signals may be monitored to detect communications from other vehicles or infrastructure devices. DSRC signals may be broadcast in a 75 MHz spectrum within the 5.9 GHz frequency band. The DSRC signals may be transmitted by infrastructure components as part of a vehicle to infrastructure (V2I) communication system. The DSRC signals may be transmitted by other vehicles as part of a vehicle to vehicle (V2V) communication system. In some configurations, the other vehicle may transmit position information via the DSRC signals. The position of the other vehicle relative to the vehicle 10 may be displayed on the display 18.

One or more of the wireless receivers 26, 30 may be configured to monitor medium range wireless signals related to remote control devices. The remote control devices may be cars or aircraft. The remote control devices may transmit wireless signals to a control module operated by a person. The boundary detection system 56 may be configured to detect wireless transmissions from the remote control device and the associated control module. The medium range wireless signals may be 2.4 GHz spread-spectrum signals. The wireless receivers 26, 30 may be configured to monitor Direct Sequence Spread Spectrum (DSSS) and/or Frequency Hopping Spread Spectrum (FHSS) transmissions. In addition, frequencies in the 900-915 Mhz range may be monitored for activity. Other frequency ranges used by typical remote control devices may also be monitored.

The wireless communications system 24 may be configured to monitor communications transmitted by the nomadic device 34 (e.g., phone, tablet, computer). The wireless communication system 24 may be configured to receive the wireless signals without interfering with the wireless signals. The nomadic device 34 may have established a connection to an external network 38, 58. The controller 42 may be programmed to implement an appropriate communications protocol in hardware and software to receive messages transmitted according to the selected wireless communication protocol. In some configurations, the wireless communication system 24 may be implemented as part of the controller 42. In other configuration, the function of the wireless communication system 24 may be distributed among multiple modules.

The wireless receivers 26, 30 may be configured to process the electrical signals from the antennas 28, 32 and convert them into digital data. The wireless receivers 26, 30 may be configured to process electrical signals in a predetermined range of frequencies. The wireless receivers 26, 30 may include one or more amplifier stages to increase an amplitude of the electrical signal or otherwise scale the electrical signal to a desired voltage range. The wireless receivers 26, 30 may include one or more mixer stages to demodulate the electrical signal. The mixer stages may filter out carrier frequencies of the transmitted signal and output a baseband electrical signal. The wireless receivers 26, 30 may include one or more filters that are configured to pass signals that have a frequency within a predetermined frequency range (e.g., low pass, band pass). The wireless receivers 26, 30 may include one or more analog-to-digital (A/D) converters to convert the electrical signals from an analog signal into a digital value. The wireless receivers 26, 30 may include a processor (e.g., Digital Signal Processor (DSP)) and memory that are configured to run programs to process the digital signals and control the wireless receiver components. The processor may execute instructions to decode the digital signals and output digital data to the controller 42. The wireless receivers 26, 30 may transfer data to the controller 42 via the vehicle network.

The wireless receivers 26, 30 may also be configured to measure the strength of the received signal. For example, a circuit may be implemented that converts the signal from the associated antenna 28, 32 into an analog voltage proportional to the amplitude of the signal received. In general, the magnitude of the signal may increase as the distance between the transmitter (e.g., nomadic device 34) and the antenna 28, 32 decreases. The analog voltage may be sampled via an analog-to-digital converter to provide a digital value to the controller 42.

The wireless communication system 24 may be implemented in part as an integrated circuit. The wireless communication system 24 may include discrete components coupled to the integrated circuit as necessary. As many integrated circuits are available for various wireless communication protocols, the specific details and configuration for each may vary. The specific details of each of the wireless communication receivers 26, 30 and interconnection of components and stages depends on the particular wireless communication protocol being processed. The wireless communication system 24 may communicate with the controller 42 via the vehicle network.

The wireless communication protocols may define how signals are wirelessly transmitted. The protocol defines the frequency ranges and the way in which signals are encoded for wireless transmission. Further, the protocol may define the expected content and formatting of the data represented by the signals. For example, message header information and data bytes may be specified. The wireless communication system 24 may receive and process the wireless signals and output the header information and data bytes to the controller 42.

In some configurations, the wireless communication system 24 may be utilized to transmit messages from the boundary detection system 56. In such configurations, the wireless receivers 26, 30 may be implemented as part of a wireless transceiver module. The wireless communication system 24 may be configured to transmit messages. The wireless communication system 24 may implement any particular handshaking protocols defined by the protocol. For example, when a message is received, an acknowledgment may be required.

The controller 42 may be programmed to monitor the wireless signals received by the wireless communication system 24. The types of messages received may depend on the wireless protocol being monitored. Nomadic devices 34, such as a smartphone, that are configured to communicate wirelessly via WiFi may periodically transmit a probe request. The probe request may be transmitted to detect networks in proximity to the nomadic device 34. The probe request may include information such as a media access control (MAC) address of the nomadic device 34. The controller 42 may monitor the message traffic to determine if a probe request is received. If a probe request is received, the presence of a nomadic device 34 in the vicinity may be detected. The controller 42 may be programmed to detect the probe request.

In addition, the nomadic device 34 may be exchanging additional data with the network. For example, the nomadic device 34 may have established a connection with the external network 38, 58 and may be exchanging data with the external network 38, 58. The controller 42 may be programmed to monitor for the presence of messages and data packets being exchanged between the nomadic device 34 and the external network 38, 58. For example, the controller 42 may be programmed to monitor for Media Access Control (MAC) addresses contained in the messages to determine a source and a destination of messages. The presence of messages and data packets being exchanged may be indicative of a nomadic device 34 being in the vicinity of the vehicle 10.

In some configurations, the controller 42 may compute a signal strength for the wireless signals. A high-level signal strength may be indicative of the nomadic device 34 being nearer to the vehicle 10. Profiles of signal strength as a function of distance may be developed to estimate the distance of the nomadic device 34 from the boundary detection system 56 based on the signal strength. Additionally, changes in the signal strength over time may be monitored. The changes in signal strength over time may be analyzed to give an indication of a direction of motion of the nomadic device 34. For example, a decreasing signal strength may be indicative of the nomadic device 34 moving away from the vehicle 10. An increasing signal strength may be indicative of the nomadic device 34 approaching the vehicle 10.

The boundary detection system 56 may monitor for the presence of wireless transmissions (e.g., WiFi, cellular, Bluetooth, etc.) from the nomadic device 34. If the presence of a wireless transmission is detected, an alert may be provided to the operator of the vehicle 10. The alert may one or more of a visual alert, an audible alert and a tactile alert. The boundary detection system 56 may include a speaker for outputting the audible alert. The alert may be communicated to the operator via the user interface 16.

In some configurations, the display 18 may be configured to display the signal strength for one or more wireless communication channels. The display 18 may also be configured to display an estimated distance between the nomadic device 34 and the boundary detection system 56. In addition, the display 18 may be configured to display an indication of the wireless communication channel that generated the alert. For example, the display may indicate that the wireless signal that generated the alert was a WiFi signal. In some configurations, the display 18 may be configured to display a direction of movement of the nomadic device 34. The quantities to be displayed may be output by the controller 42.

The boundary detection system 56 may be further configured to detect the presence of approaching vehicles. The onboard radar system 12 may be used to detect radar transmissions from other vehicles. In a vehicle that includes a radar system, the radar system 12 may be passively monitored to detect radar signals emitted by approaching vehicles. That is, the radar system 12 may be configured to receive radar signals but not transmit a radar signal. Further, the amplitude of the received radar signals may provide an indication of the distance of the radar source from the vehicle 10.

The controller 42 may monitor the DSRC communication channels to identify the presence of other vehicles approaching the vehicle. When the presence of another vehicle is detected by reception of a message sent by another vehicle, the controller 42 may output an alert signal. The controller 42 may be programmed to distinguish between messages sent from a vehicle and messages sent from infrastructure components (e.g., traffic systems) according to associated communication protocols.

The controller 42 may monitor for communications that are transmitted by a drone. The drone includes any remote controlled airborne and land-based device or vehicle (e.g., remote controlled car, helicopter, etc.). For example, drones are available that are configured to carry cameras and transmit signals to a command module. Such drones could be used as surveillance devices to search for police vehicles in an area. Detection of signals from a drone may help alert the occupants of the vehicle 10 to activities of other persons in the area near the vehicle 10.

A benefit of the disclosed system is that the range of the boundary detection system 56 is extended beyond traditional boundary sensing systems. For example, an ultrasonic-based boundary system may have a range of five meters. A WiFi signal may be detected from a range of one hundred meters. Further, the disclosed boundary detection system 56 provides coverage that may not be covered by other sensors. For example, the field of view of a radar system 12 is limited to a particular angle and distance from the radar unit. Passively monitoring for wireless emissions may allow detection of objects outside of the field of view of the other sensors.

The enhanced boundary detection system 56 provides improved detection of potential threats that may be nearby. The controller 42 may generate the alert in response to sensing a presence of a person in a first area around the vehicle using existing boundary alert sensor. The detection of persons using the existing boundary alert sensors may be limited to a first zone extending from the vehicle. The controller 42 may further generate the alert in response to the wireless receivers 26, 30 receiving signals from the nomadic device 34. The detection of persons using the wireless receiver may be effective in a second zone surrounding the vehicle 10. In some configurations, the second zone may include the first zone. In some configurations, the second zone may only include part of the first zone.

Figure 3:
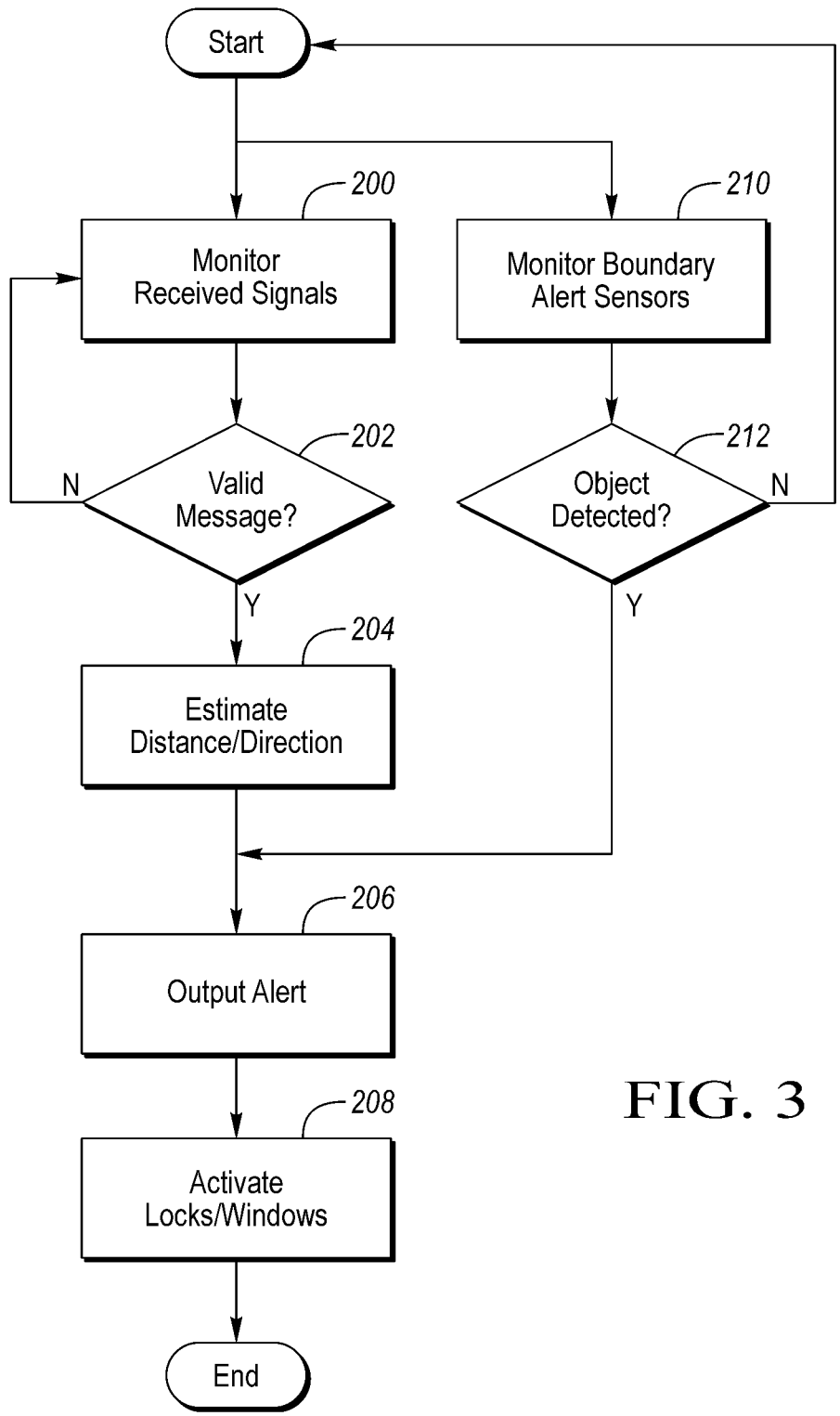
FIG. 3 is a flowchart for a possible sequence of operations for the boundary detection system.

FIG. 3 depicts a flowchart for operations that may be executed by the controller 42 to implement the boundary detection system 56. At operation 200, the controller 42 may monitor received signals to determine if any message traffic from a nomadic device 34 is present. The controller 42 may monitor wireless traffic using one or more wireless protocols as described. At operation 202, the controller 42 may detect if the received signals constitute a valid message from the nomadic device 34. If a valid message is received, operation may continue at operation 204. If a valid message is not received, operation may transfer back to the start to repeat.

Once a valid message is received, instructions may be executed at operation 204 to detect the distance and direction of the nomadic device 34. The distance and direction may be based on the signal strength of the wireless signal. Operation 206 may then be performed.

In parallel to monitoring the wireless communication signals, the operations for monitoring the boundary alert sensors may be performed. At operation 210, the boundary alert sensors may be monitored. At operation 212, the controller 42 may check if an object is detected by the boundary alert sensors. If an object is not detected, operation may return to the start to repeat. If an object is detected, operation 206 may be performed.

At operation 206, an alert may be output to indicate the presence of the nomadic device 34 to occupants of the vehicle 10. At operation 208, door locks may be actuated to a locked position and open windows may be closed in an effort to protect the vehicle occupants.

Although the boundary alert system is discussed as being a vehicle application, the boundary alert system may be implemented separate from the vehicle. For example, the boundary alert system may be implemented as part of a building security system or a personal boundary detection system.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A boundary detection system for a vehicle comprising:
   a controller programmed to generate an alert in response to sensing a presence of a person in a first zone extending from the vehicle; and
   a wireless receiver configured to receive signals transmitted by a nomadic device in a second zone surrounding the vehicle, the controller being programmed to passively monitor, via the wireless receiver, message traffic between the nomadic device and a receiver that is external to the vehicle and, responsive to detecting messages exchanged between the nomadic device and the receiver, output the alert.

2. The boundary detection system of claim 1 wherein the second zone includes the first zone.

3. The boundary detection system of claim 1 wherein the wireless receiver is configured to receive signals transmitted according to at least one of a plurality of IEEE 802.11 wireless communication standards.

4. The boundary detection system of claim 1 wherein the wireless receiver is configured to receive signals transmitted to a cellular phone network according to at least one of a plurality of cellular communication standards.

5. The boundary detection system of a claim 1 wherein the wireless receiver is configured to receive signals transmitted according to at least one of a plurality of Bluetooth communication standards.

6. The boundary detection system of claim 1 wherein the wireless receiver is configured to receive signals transmitted from a dedicated short-range communication system.

7. The boundary detection system of claim 1 further comprising a display and wherein the controller is further programmed to output, to the display, an indication of a type of signal that caused the alert.

8. The boundary detection system of claim 1 wherein the wireless receiver is further configured to output a signal strength of the signals that are received.

9. The boundary detection system of claim 8 wherein the controller is further programmed to estimate a distance of the nomadic device from the vehicle based on the signal strength.

10. The boundary detection system of claim 8 wherein the controller is further programmed to estimate a direction of travel of the nomadic device based on a change in the signal strength.

11. The boundary detection system of claim 1 wherein the controller is further programmed to, in response to the alert, command activation of door locks.

12. The boundary detection system of claim 1 wherein the controller is further programmed to, in response to the alert, command windows that are open to close.

13. The boundary detection system of claim 1 further comprising a radar receiver configured to monitor for radar signals transmitted by other vehicles, and wherein the controller is further programmed to output the alert in response to receiving radar signals transmitted by other vehicles.

14. A vehicle comprising:
    a boundary alert sensor configured to detect a presence of a person located in a first zone extending from the vehicle;
    a wireless receiver configured to receive signals transmitted to a receiver external to the vehicle by a nomadic device that is outside of the vehicle in a second zone surrounding the vehicle and including at least part of the first zone; and
    a controller programmed to passively monitor, via the wireless receiver, message traffic between the nomadic device and the receiver and, in response to the presence of the person being detected in the first zone, output an alert, and, in response to detecting messages exchanged between the nomadic device and the receiver, output the alert.

15. The vehicle of claim 14 wherein the wireless receiver is configured to receive signals transmitted according to at least one of a plurality of IEEE 802.11 wireless communication standards.

16. The vehicle of claim 14 wherein the wireless receiver is configured to receive signals transmitted to a cellular phone network according to at least one of a plurality of cellular communication standards.

17. The vehicle of claim 14 wherein the wireless receiver is configured to receive signals transmitted according to at least one of a plurality of Bluetooth communication standards.

18. The vehicle of claim 14 wherein the wireless receiver is configured to receive signals transmitted from a dedicated short-range communication system.

19. A method of detecting a person in a vicinity of a vehicle comprising:
    monitoring, by a controller, a boundary alert sensor configured to detect a presence of a person located in a first zone extending from the vehicle;
    outputting, by the controller, an alert in response to detecting the presence of the person in the first zone;
    monitoring, by the controller, for wireless signals transmitted to a receiver external to the vehicle by a nomadic device that is in a second zone surrounding the vehicle; and
    outputting, by the controller, the alert in response to receiving the wireless signals.

20. The method of claim 19 further comprising outputting, by the controller, a type of wireless signal that caused the alert.

* * * * *